United States Patent [19]
Takatori et al.

[11] Patent Number: 5,128,939
[45] Date of Patent: Jul. 7, 1992

[54] METHOD OF PHASE-CONVERTING FRAME AND APPARATUS USING SAME

[75] Inventors: Masahiro Takatori, Kokubunji; Yukio Nakano, Hachioji; Tadayuki Kanno; Hiromi Ueda, both of Yokohama, all of Japan

[73] Assignees: Hitachi, Ltd.; Nippon Telegraph and Telephone Corporation, both of Tokyo, Japan

[21] Appl. No.: 507,506

[22] Filed: Apr. 11, 1990

[30] Foreign Application Priority Data

Apr. 14, 1989 [JP] Japan .................................. 1-93022

[51] Int. Cl.⁵ ............................................. H04J 3/06
[52] U.S. Cl. ................................ 370/100.1; 370/105.1
[58] Field of Search ................. 370/100.1, 105.1, 112, 370/58.1

[56] References Cited

U.S. PATENT DOCUMENTS

| | | | |
|---|---|---|---|
| 4,490,819 | 12/1984 | Bogen et al. | 370/100.1 |
| 4,941,141 | 7/1990 | Hayano | 370/100.1 |
| 4,953,163 | 8/1990 | Miyamoto et al. | 370/100.1 |

OTHER PUBLICATIONS

Synchronous Optical Networks (SONET), Bell Communication Research, May 2, 1987, pp. 18-27, 56-65.

*Primary Examiner*—Douglas W. Olms
*Assistant Examiner*—Dang T. Ton
*Attorney, Agent, or Firm*—Antonelli, Terry, Stout & Kraus

[57] ABSTRACT

Disclosed is a method and apparatus of phase-converting a frame, each frame containing a plurality of data, a frame synchronous signal arranged in a predetermined first relative phase position in the frame, and a pointer arranged in a predetermined second relative phase position and storing a value indicating a phase difference between the second relative phase position and the front position of the data in the frame, in which the following operations are carried out: consecutively receiving the frames; sequentially arranging a predetermined number of data among the plurality of data in the received frame in a transmission frame in accordance with a received order, and arranging the frame synchronous signal and the pointer in the received frame in the first relative phase position and the second relative phase position, the first relative phase position being independent to the second relative phase position, to form the tansmission frame; detecting a fourth relative phase position in the transmission frame, the fourth relative phase position storing a data same as a specific data arranged in a third relative phase positon in the received frame; obtaining a difference between the fourth relative phase position and the third relative phase position; and setting the difference between the value of the pointer in the received frame and the obtained phase difference as the value of the pointer in the transmission frame.

26 Claims, 9 Drawing Sheets

METHOD OF PHASE-CONVERTING FRAME AND APPARATUS USING SAME

BACKGROUND OF THE INVENTION

The present invention relates to a method of converting a frame of bit stream on the basis of a pointer conversion and an apparatus of using same. More particularly, it relates to a method of phase-converting a frame by using a pointer indicating the front position of data in a frame when a phase synchronization is carried out in a time division multiplexing digital signal transmission system.

In a transmission network in which a time division multiplexing digital signal transmission is carried out, apparatuses (network nodes or interfaces) each of which converts a signal(s) on an input line(s) to a signal(s) having a signal form(s) adaptive to an output line(s), are required. The fundamental function of that conversion is a frame signal phase conversion. New methods for carrying out the phase conversion among those methods in which a pointer in each frame is provided to indicate the front position of multiplexed data in the frame, are known. For example, a Synchronous Optical Network (SONET), described in Technical Advisory, TA-TSY 00253, published on May 2, 1987 by Bell Communication Research Institute, is known as one of those new methods.

In the method for carrying out the phase conversion of the frame by using the pointer, each frame in a communication signal is comprised of a frame synchronous signal, a pointer and an overhead signal, which are arranged in fixed positions in the frame, and data arranged in positions other than the fixed positions in the frame. The number of bytes from the position arranged the pointer to the front position of the data, i.e., an offset value, is written in a pointer storage portion in the frame. Unless the value of the pointer is changed, the front of the data is located at a same offset position in each frame.

When the frame including the pointer is received and data are to be rearranged in a new frame which is different from the received frame, a value of the pointer must be changed to accommodate the new frame. This method for carrying out the phase conversion of the frame signal by using the pointer does not suffer from a retardation of the data signal process, occurred in the prior art methods in which the conversion is carried out on the basis of the frame synchronous signal, and enables a circuit arrangement to be simplified in an apparatus such as a line exchanger.

A recommendation of an International Standard of the method for carrying out the phase conversion of the frame signal by using the pointer had been enacted, however specific methods and specific apparatuses for carrying out that phase conversion have not yet been established.

SUMMARY OF THE INVENTION

Several methods for realizing the International Standard may be assumed by persons with ordinary skill in the art. An general method in such assuming methods will be described for reference. In an apparatus for carrying out a frame phase conversion, data in a frame in a received signal are sequentially stored in a frame memory by sequentially designating an address. On the other hand, each pointer is detected in each frame in the received signal, a value of the detected pointer is set in a downcounter, to thereby start the operation of a downcount of the set value from a time at which an offset zero position in a frame of a transmission signal appears, every slot of the transmission frame. When the downcounted value in the downcounter reaches zero, the address of the frame memory, i.e., the last address by which the data designated by the pointer was finally stored, is stored in the frame memory. In an output side where produces a new transmission frame, an output counter provided thereat is set to zero which indicates that the offset value counted from the position of the pointer in the frame is zero on the basis of the frame synchronous signal in the transmission frame, and to thereby start the counting of the output counter. The data are sequentially read out from the frame memory by designating the address to the frame memory, and the read data are stored into certain positions among the positions in the transmission frame including the frame synchronous signal, the pointer and the overhead signal, to thereby result in the data multiplexing. To set the value to the position of the pointer in the transmission frame, by taking account of the fact that the value of the address of the frame memory by which the front of the data was detected in the received frame, indicates the front position of the data in the transmission frame, a method in which the output counter at the output side measures a time between a time at which the value of the pointer in the transmission frame is set and a time at which the front position of the data is read, and the measured time which indicates the offset is set to the pointer, may be adopted.

In the method described above, in a steady state, i.e., in the case of the values of the pointers in the consecutive reception frames are not changed, no problem arise. However, when the value of the pointer in the reception frame is varied, a new setting of the value of the pointer to the transmission frame is required, and a time for setting the new pointer may exceed two frame data transmission time. Consequently, a problem of signal loss over two frame signals may occur. If such method is applied to communication systems in which variations of the values of the pointers may frequently occur, a low transmission quality may be resulted in.

An object of the present invention is to provide a method and an apparatus which carry out a phase conversion of a frame, correctly enabling a set of a value of a pointer to a transmission frame on the basis of a value of a pointer in a reception frame at a high speed.

Another object of the present invention is to provide a method for correctly setting a value of a pointer in a transmission frame within one frame transmission time from a time at which a change of a value of the pointer in the reception frame is detected when the value of the pointer in the reception frame is varied, and also to provide an apparatus for carrying out the method.

To achieve the above objects, according to an aspect of the present invention, in a method and an apparatus for carrying out a phase conversion of a frame including a plurality of data, a frame synchronous signal arranged in a predetermined first relative phase position in the frame, and a pointer arranged in a predetermined second relative phase position and storing a value indicating a phase difference between the second relative phase position and the front position of the data in the frame, the frames are consecutively received. A predetermined number of data among the plurality of data in the received frame are arranged in a transmission frame, and the transmission frame is formed so that the frame synchronous signal and the pointer are arranged in a predetermined first relative phase position and a predetermined second relative position, respectively. The predetermined first relative phase position is different than the predetermined second relative phase position. A fourth relative phase position in the transmission frame wherein a data which is same as a specific data arranged in a third relative phase position in the received frame exists, is detected, a difference between the fourth and third relative phase positions is obtained, and a difference between the value of the pointer in the received frame, and the obtained phase position difference is set as a value of the pointer in the transmission frame.

According to another aspect of the present invention, a predetermined number of data units (data time slots) arranged time-serially and each having a predetermined number of data, a frame synchronous signal arranged in a first relative phase position, and a frame having a pointer storing a value indicating the number of the data units from the second relative phase position to the front position of the data are sequentially received; a transmission frame is formed by arranging a predetermined number of data among the received data units (the data time slots) in the receiving frame in accordance with a reception order, and, arranging the frame synchronous signal and the pointer in the first relative phase position and the second relative phase position, the phase position of the frame synchronous signal being independent to the phase position of the pointer; a fourth relative phase position existing data in the transmission frame, the data being equal to a specific data located in a third relative phase position in the received frame; the number of the data units (the time slots) between the third relative phase position and the fourth relative phase position in the frame is obtained; and a difference between the value of the pointer in the received frame and the number of the obtained data units (the time slots) is set as a value of the pointer of the above transmission frame.

More specifically, a circuit is constructed so that the value of the pointer in the received frame is stored in a downcounter, and a value downcounted in the downcounter by the calculated phase position difference between the received frame and the transmission frame, i.e., a length of data units or time slots, is set as the value of the pointer in the transmission frame.

To early detect early, the phase difference between the received frame and the transmission frame, i.e., the length of the data units or the time slots before detecting the pointer in the transmission frame, a specific data located immediately before o immediately after the pointer in the received frame is detected, and a phase between a detection time of the specific data and a time at which the specific data contained in the transmission frame is generated, i.e., a time indicating the number of the data units or the number of the time slots, is measured.

If the value of the pointer in the received frame is X, that is, the front of the data in the received frame is located at the X-th position from the time slot of the pointer, and, a relative phase of the data at the offset zero position for judging the received frame, is phase-shifted by $\alpha$ time slots between the transmission frame and the reception frame, the value of the pointer is $X - \alpha$. In the present invention, even the value of the pointer in the reception frame is changed, a new value of the pointer and the phase difference can be obtained before setting the value of the pointer in the transmission frame, and accordingly, the setting of the new value of the pointer can be achieved within one frame transmission time, in other words, immediately after the detection of the phase difference between the reception frame and the transmission frame, to thereby reduce a signal loss.

BRIEF DESCRIPTION OF THE DRAWINGS

Other objects and features of the present invention will be described in more detail with reference to the accompanying drawings, in which:

FIGS. 4(A) to 4(E) shows a timing chart explaining the operation of the frame phase conversion apparatus of the embodiment of the present invention;

DESCRIPTION OF THE PREFERRED EMBODIMENTS

Preferred embodiments of the present invention will be described with reference to the accompanying drawings.

Figure 1:
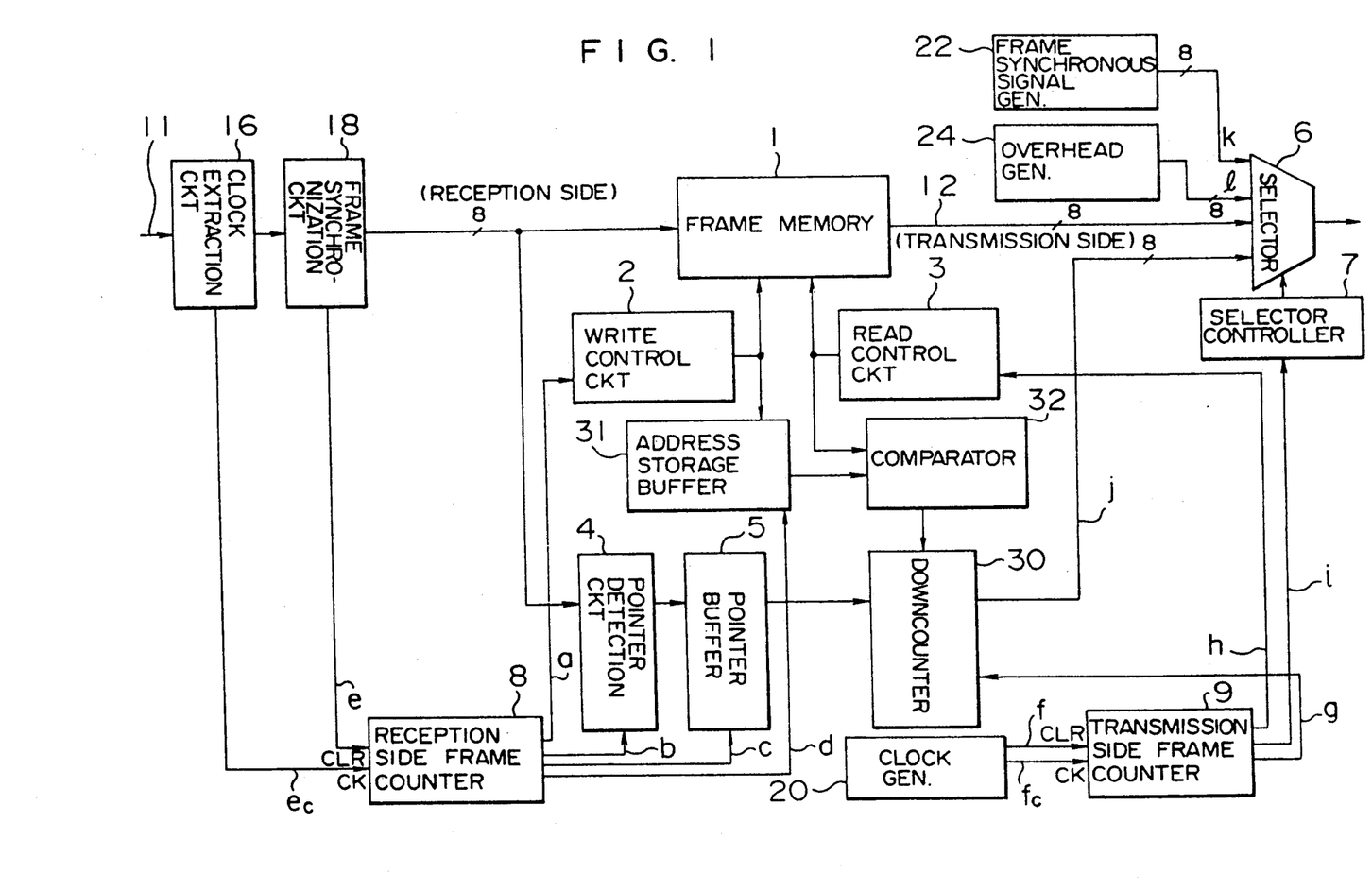
FIG. 1 is a diagram illustrating a construction of a first embodiment of a frame signal phase conversion apparatus in accordance with the present invention.

FIG. 1 is a diagram illustrating a construction of a first embodiment of a frame phase conversion apparatus in accordance with the present invention.

The frame phase conversion apparatus of the embodiment of the present invention includes a clock extraction circuit 16 extracting a clock $e_c$ from a reception frame on an input signal highway 11, a frame synchronization circuit 18 extracting a frame synchronous signal e, a frame memory 1 storing data in the reception frame, a write control circuit 2 outputting a write address to the frame memory 1 when the data in the reception frame are stored in the frame memory 1, a pointer detection circuit 4, detecting a pointer, a value of which indicates the front position of the data in the reception frame, a pointer buffer 5 storing the value of the pointer which is detected, an address storage buffer 31 storing an address when a data in a specific time slot in the frame is stored to the frame memory 1, a reception side frame counter 8 outputting signals for controlling the circuits 2, 4, 5 and 31 described above, a downcounter 30, a read control circuit 3 outputting a read address to the frame memory 1 when the data are read from the frame memory 1, a comparator 32 comparing with the value from the address storage buffer 31 and the address output from the read control circuit 3, a frame synchronous signal generator 22 generating a frame synchronous signal k, an overhead signal generator 24 generating an overhead signal l, a selector 6, a selector control circuit 7 controlling the selector 6, a clock generator 20 generating a transmission side clock $f_c$ for the transmission frame, and a transmission side frame counter 9 generating signals g, h and i for controlling the circuits, 3, 7 and 30, described above.

Before describing the operation of the frame phase conversion apparatus, signal formats which are processed by the frame phase conversion apparatus will be described.

Figure 2:
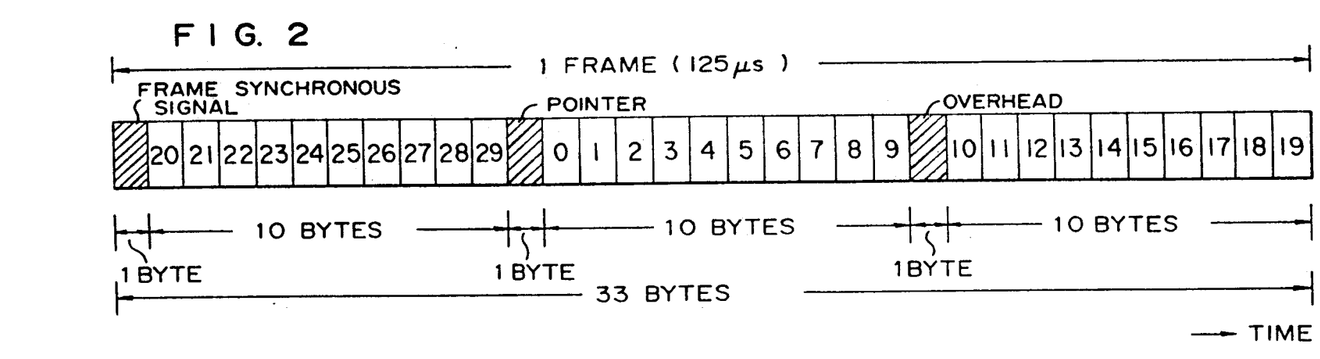
FIGS. 2 and 3 are views illustrating formats of frame signals used in the present invention.

FIG. 2 is a view of a format of one frame in the frame signal, the one frame having a length of, for example, 125 μs time length and comprised of 33 bytes. In specific positions in the frame, for example, as shown in the FIG. 2, in first byte, the 12-th byte and the 23-th byte, time slots for the frame synchronous signal, the pointer and the overhead signal are provided. Here, the lengths of the frame synchronous signal, the pointer and the overhead signal are one byte, respectively. Among the time slots, thirty (30) of time slots for the data each being one byte are arranged. Numerals represented in the 30 data time slots, as shown in FIG. 2, indicate offset numbers from the position of the pointer.

Figure 3:
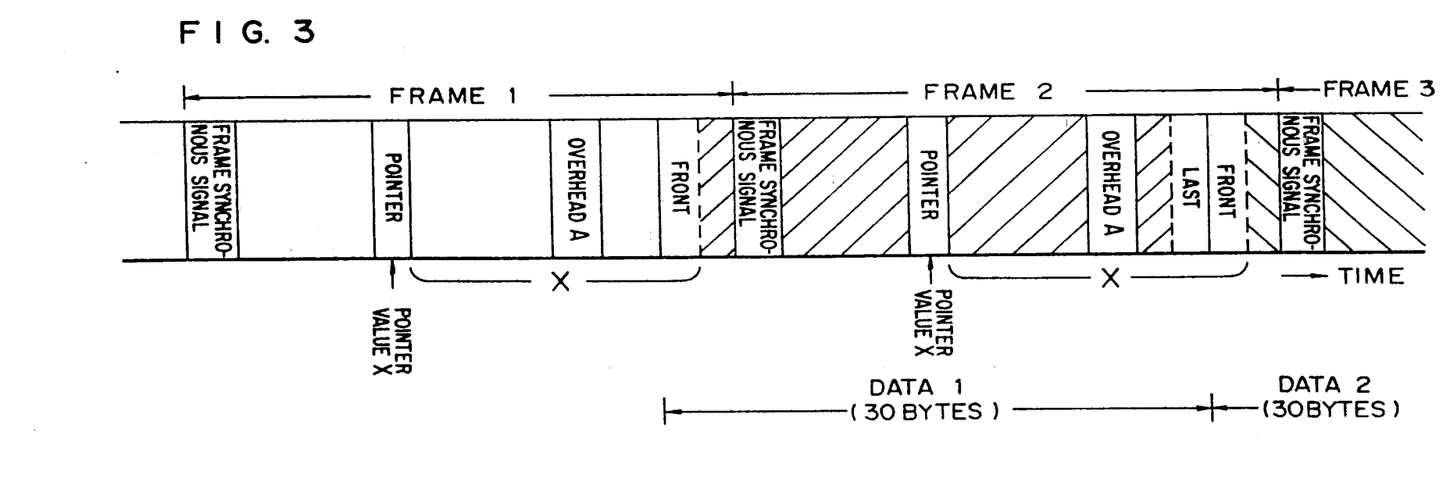

The value of the pointer represents the front position of the data in the frame, the offset number to the front position of data in the frame. Namely, as shown in FIG. 3, occasionally, since the data which could be in one frame, e.g. DATA 1 is distributed over two frames: FRAME 1 and FRAME 2, to clearly indicate the front of the data in one frame is necessary. For this purpose, the offset value of the time slot located in the front position of the data, the offset value in this example shown in FIG. 3 being X, is stored in the pointer. Specifically, when the value of the pointer is zero (0), the front position of the data is located at the offset zero position shown in FIG. 2, and the last position of the data is indicated by the offset value 29. Alternatively, when the value of the pointer is 15, the front position of the data is located in the position of the offset 15. Unless the value of the pointer is varied, the respective front positions of the respective data occupy same offset positions in the respective frames.

When the signal having the above mentioned frame construction is received and a new transmission frame is constructed in accordance with the received signal, according to the frame synchronization method using the pointer, time positions of the frame synchronous signal, the pointer and the overhead signal of the transmission frame are independently set to those of the reception frame, but the data of the transmission frame appear at approximately same position of the data of the reception frame. A short retardation of time slots may occur due to a time lag based upon the signal process.

FIGS. 4(A) to 4(E) shows a timing chart illustrating the relationship of the time between the reception frame and the transmission frame, and the drawing refers to the abovementioned principle operation of the present invention. To simplify the illustration of the drawing, only the time slots necessary for describing the operation of the present invention are illustrated.

Figure 4A:
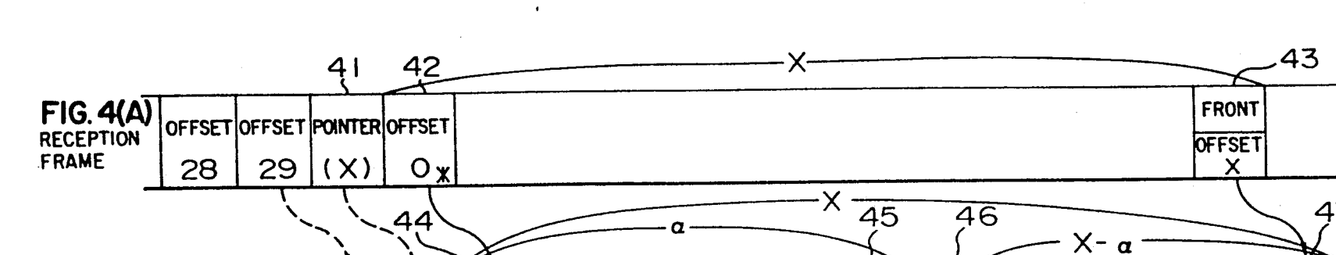
Figure 4B:
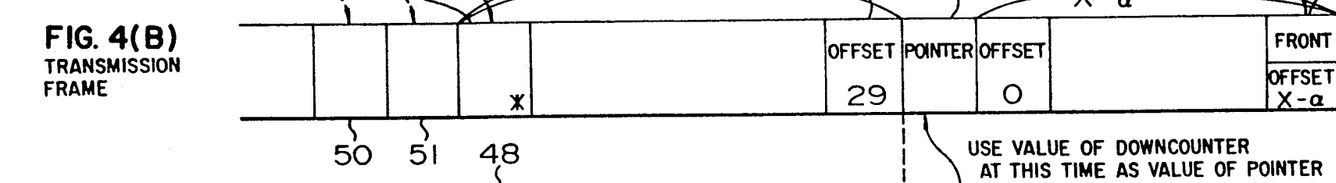
Figure 4C:
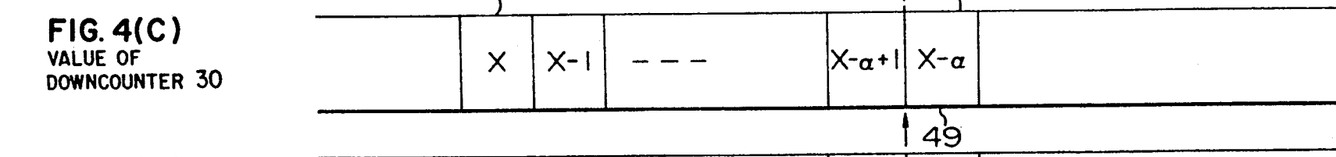

As shown in the drawings, the time slots of the data in the transmission frame are delayed with respect to the time slots for the same data in the reception frame by several time slots, because of the time delay between the time at which the data is stored in frame memory 1 and the time at which the data is stored into the transmission frame. The setting of the position of the pointer in the reception frame is independent of the setting of the position of the pointer in the transmission frame, and then, the offset value $X-\alpha$, indicating the number of time slots between the time slot of the pointer and the time slot of the front position of the data, may be obtained.

The present invention determines the pointer in the transmission frame before the setting of the pointer in the transmission frame and after the detection of the value of the pointer in the reception frame, i.e., within one frame data transmission time after the detection of the change of the value of the pointer in the transmission frame. To realize the above purpose, in the embodiment, the phase difference between a relative phase of the data in the reception frame and a relative phase of the data in the transmission frame is detected before the setting of the pointer to the transmission frame, and then the value of the pointer for the transmission frame is set. In FIGS. 4(A) to 4(E), a specific data, i.e., the data at the offset zero position in the transmission frame appears at the time slot 44 in the transmission frame, and the front of the data appears at the time slot 47. The number of the data between the time slot 44 and the time slot 47 coincides with the value of the pointer in the reception frame. Assuming that the number of the data from the position where the data of the offset zero of the reception frame, i.e., the time slot 44 is located, to the position of the pointer in the transmission frame, i.e., the time slot 46, is $\alpha$. This value $\alpha$ means that the phase difference between the phase of the data in the reception frame and the phase of the data in the transmission frame corresponding to the data in the reception frame. Accordingly, the number of the data (the offset value) from the position of the pointer in the transmission frame, i.e., the time slot 46 to the position of the front of the data appeared in the transmission frame, i.e., the time slot 47, is $X-\alpha$. To obtain the offset value $X-\alpha$, the downcounting of the value in downcounter 30 in which the value X of the pointer is stored is started from the time at which the data 42 of the offset zero in the reception frame appears, is started and continued until the position in the transmission frame reaches the pointer. The downcounted value can be $X-\alpha$, and coincides with the offset value of the front position of the data in the transmission frame. Therefore, this value $X-\alpha$ can be used as the value of the pointer in the transmission frame.

Figure 5A:
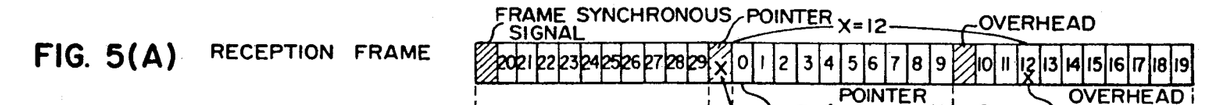
FIGS. 5(A) to 5(N) shows a timing chart representing signals in the frame phase conversion apparatus shown in FIG. 1.
Figure 5B:
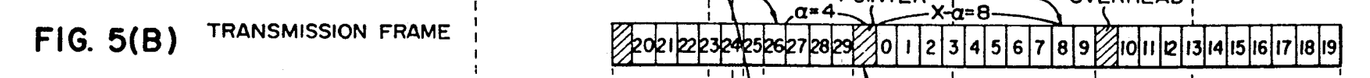
Figure 5C:
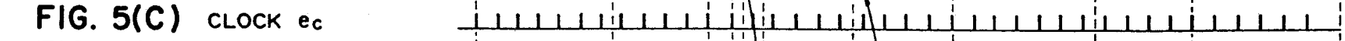
Figures 5D, 5E, 5F:
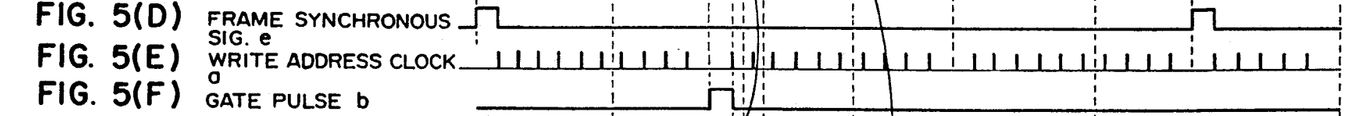
Figure 5G:
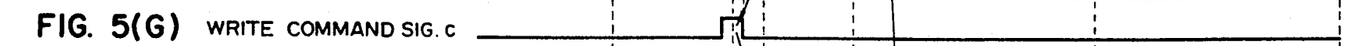
Figure 5H:
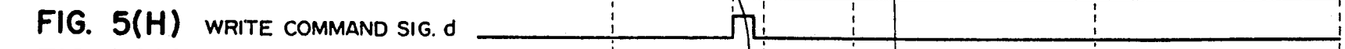
Figures 5I, 5J, 5K, 5L:
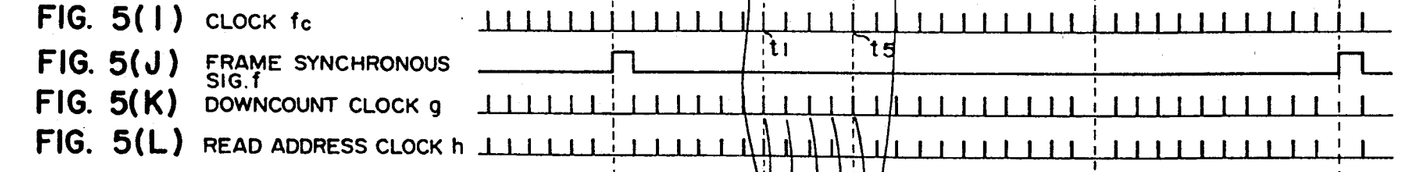
Figures 5M, 5N:
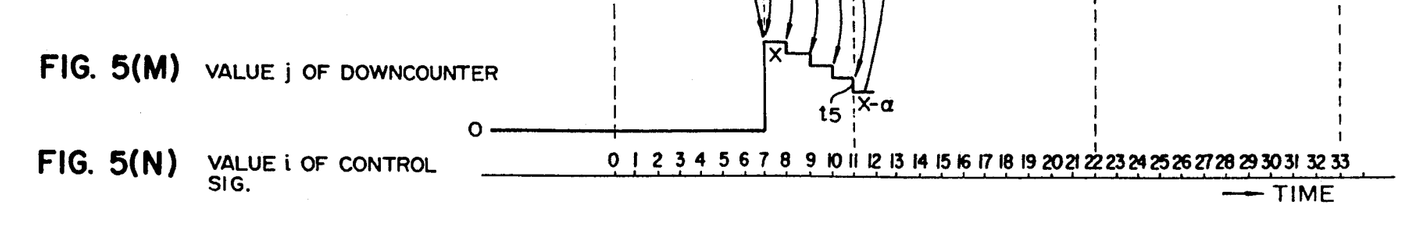

The operation of the frame signal phase conversion apparatus shown in FIG. 1 will be described with reference to FIGS. 5(A) to 5(N) showing the time chart of the signals indicated in FIG. 1.

In FIG. 1, at the reception side, the reception frames shown in FIG. 4(A) are input to the input signal highway 11. The input signal highway 11 and an output signal line 12 are depicted by a single line, respectively, however, note that since the reception frame is converted from a serial form to a parallel form and processed as a parallel signal in the frame phase conversion apparatus, the input signal highway 11 and the output signal line 12 are comprised of eight wires for transferring one byte signal, respectively. The clock extraction circuit 16 generates the clock $e_c$ shown in FIG. 5(C), synchronized with each time slot in the reception frame, and the frame synchronization circuit 18 also generates the frame synchronous signal e (FIG. 5(D)) synchronized with the frame synchronous signal in the reception frame. These clock $e_c$ and frame synchronous signal e are input to a clock input terminal and a clear signal input terminal CLR of the reception side frame counter 8, respectively.

The reception side frame counter 8 comprises a decoder circuit, and generates a clock pulse a supplied to the write control circuit 2, a gate pulse b supplied to the pointer detection circuit 4, a write command signal d supplied to the address storage buffer 31, in response to the frame synchronous signal e and the block $e_c$. The clock pulses a is the pulse signal which comprises a plurality of pulses including omitted pulses for the frame synchronous signal, the pointer and the overhead signal from the clock $e_c$. Accordingly, the pulse clock a is obtained by masking the clock pulses $e_c$ at the time of the reception of the frame synchronous signal e, at the 11-th time slot and the 22-th time slot. The clock pulse a is shown in FIG. 5(E). The gate pulse b is a pulse appearing at the position of the pointer in the reception frame, and thus, the gate pulse b is produced so that it is generated by the 11-th clock $e_c$ after reception of the frame synchronous signal e and eliminated at the 12-th clock $e_c$ as shown in FIG. 5(F). The write command signal d is obtained by slightly retarding the phase of the gate pulse e (FIG. 5(G)). The write command signal d is a pulse synchronized with the time slot of the offset zero in the reception frame, and is produced so that it is generated by the clock $e_c$ at the 12-th time slot after reception of the frame synchronous signal e and eliminated by the clock $e_c$ at the 13-th time slot (FIG. 5(H)).

The transmission side frame counter 9 includes a decoder circuit, and generates a downcount clock g supplied to the downcounter 30, a read clock h supplied to the read control circuit 3 and a selector control signal i supplied to the selector 7.

The clock generator 20 generates the transmission side clock $f_c$ being independent to the clock $e_c$ and having a frequency value, for example, equal to a frequency value of the clock $e_c$ (FIG. 5(I)), and the frame synchronous signal f for the transmission frame having a frequency value which is a 1/33 frequency-divided value of the frequency of the transmission side clock $f_c$ (FIG. 5(J)). The transmission side clock $f_c$ and the frame synchronous signal f are supplied to a clock input terminal and a clear signal input terminal CLR of the transmission side frame counter 9.

The transmission side frame counter 9 carries out the masking of the clock $f_c$ by the clock $f_c$ the phase of which is equal to the phase of the frame synchronous signal f and the 22-th clock $f_c$ corresponding to the phase of the overhead signal, and outputs unmasked clock pulses as the downcount clock g (FIG. 5(K)).

The read address clock h is a clock pulse including omitted pulses as the frame synchronous signal f of the transmission frame signal, and the clock $f_c$ appear at the phase of the pointer and the overhead signal. Accordingly, the read address clock h is obtained by masking the clock $f_c$ by the clock $f_c$ appearing at the phase of the frame synchronous signal f, and the 11-th and 22-th clocks $f_c$ from the frame synchronous signal f, outputting the remained pulses of the clock $f_c$ (FIG. 5(K)).

The control signal i is a count output of the number of pulses of the clock $f_c$. The control signal i is reset by the frame synchronous signal f, and is increased by the input of the clock $f_c$ to the transmission side frame counter 9, to represent the number of the pulses of the clock $f_c$ from the frame synchronous signal f.

In the reception side, the write control circuit 2 sequentially generates a write address in response to the clock a and adds the write address to the frame memory 1 to sequentially store the data in the reception frame to positions in the frame memory 1 designated by the address from the write control circuit 2.

The pointer detection circuit 4 detects the pointer in response to the gate pulse b, and inputs the detected value of the pointer to the pointer buffer 5. The pointer buffer 5 stores the received value of the pointer in response to the write command signal c. The address storage buffer 31 stores the write address from the write control circuit 2 when the data of the offset zero in the reception frame is stored to the frame memory 1, in response to the write command signal d.

In the reception side, the read control circuit 3 sequentially generates the read address in response to the clock h to sequentially read the data stored in the frame memory 1, and outputs the read data to the signal line 12.

The comparator 32 compares with the write address in the address storage buffer 31 and the read address of the read control circuit 3, and outputs a coincidence output signal when both the addresses are matched, in other words, when an appearance of the data of the offset zero in the received frame is detected at the transmission side. Namely, as shown in FIGS. 5(A) to 5(N), when the front data in the reception frame is located in the offset 12 position, i.e., X=12, and the data of the offset zero of the reception frame appears at the offset 26 position in the transmission frame, the read address supplied to the comparator 32 coincides with the write address in the address storage buffer 31 (at the time $t_1$), and the coincidence output signal is supplied to the address storage buffer 31. The downcounter 30 stores the value X of the pointer buffer 5 in response to the coincidence output signal, and subsequently, the downcount is carried out in response to the clock g at the timings other than the timings at which the frame synchronous pattern and the overhead signal are appeared in the transmission frame (These pulses, of course, are omitted from clock g.). When the value in the downcounter 30 reaches zero, the maximum value of the offset, e.g. the maximum value being 29 when the frame is used shown in FIG. 2, is set to the downcounter 30. The downcounting is carried out until the value of the downcounter 30 indicates the front position $X-\alpha$ of the data in the transmission frame. The reasons are as follows: as shown in FIGS. 4(A) to 4(E), when the value of the pointer is X, the number of the data from the offset zero position in the reception frame to the front position of the data is X, and accordingly, the number of the data from the position where the data of the offset zero in the reception frame appears in the front position of the data in the transmission frame is also X. If the downcounting is started at the time at which the data of the offset zero appears in the position of the pointer in the transmission frame, the value of the downcounter 30 indicates the value of the offset value of the front position of the data in the transmission side. Accordingly, this value can be employed as the value of the pointer. Namely, in the example shown in FIGS. 5(A) to 5(N), the downcounting is started at the time $t_1$ at which the data of the offset zero is appeared at the transmission side to the time $t_5$ at which the pointer is appeared, the value $X-\alpha(=12-4=7)$ indicates the value of the pointer in the transmission frame.

Therefore, the selector control circuit 7 controls the selector 6, so that the frame synchronous signal f and the overhead signal l are selected when the value i of the control signal is zero (0) and 22, so that the count value j of the downcounter 30, as the value of the pointer, is selected when the value i of the control signal is zero (0) and 11, or so that the data signal on the output signal 12 is selected at the timings other than the timings when the count values i=0, 11 and 22. As a result, the transmission frame shown in FIG. 5(B) is output.

According to the frame phase conversion apparatus of the embodiment of the present invention mentioned above, the timing $t_1$ at which the specific data in the reception frame is output at the transmission side is detected by the address storage buffer 31 and the comparator 32, the number of the time slots $\alpha$ from the output timing to the position of the pointer in the reception side is obtained by the downcounter 30 and the selector control circuit 7, and the value $X-\alpha$ is obtained.

Figure 6:
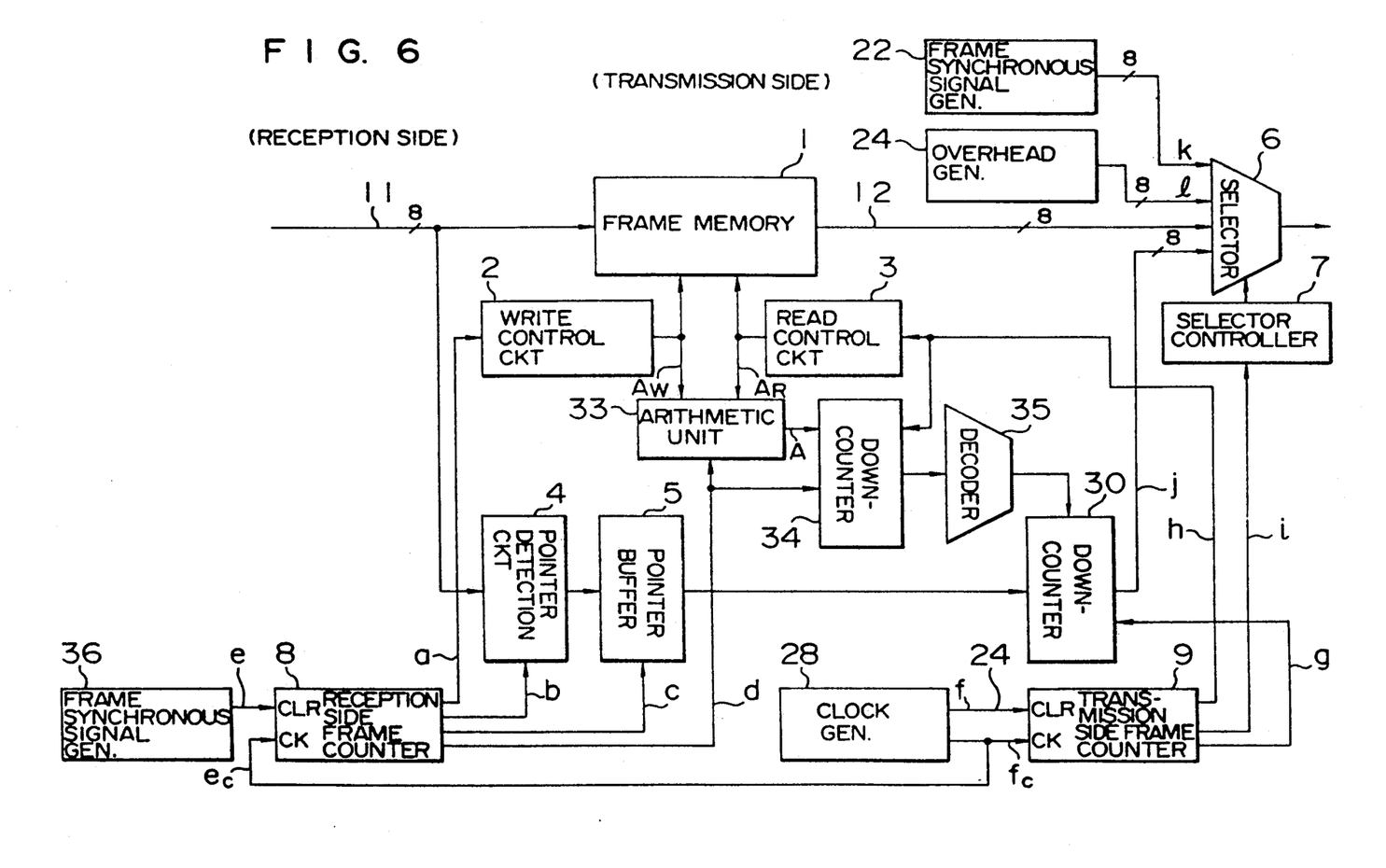
FIG. 6 is a diagram illustrating a construction of a second embodiment of a frame phase conversion apparatus in accordance with the present invention.

The second embodiment of the present invention will be described with reference to the construction of the frame phase conversion apparatus shown in FIG. 6 and the timing chart shown in FIG. 7.

In the second embodiment of the present invention, the circuits having circuit constructions same as those in the first embodiment and the signals having purposes same as those in the first embodiment bear same reference numerals as the reference numerals in the first embodiment. Differences to the first embodiment are as follows.

The frame synchronous signal e at the reception side is obtained by a frame synchronous signal generator 36 which generates a frame synchronous signal synchronized with the frame synchronous signal in the reception frame. The clock $e_c$ is generated by a clock generator 28 which generates a clock synchronized with each time slot in the reception frame, and the clock from the clock generator 28 is supplied to the transmission side frame counter 9 as a transmission side clock $f_c$. The clock generator 28 divides the clock $f_c$ by 33, i.e., 1/33, and outputs a transmission side frame synchronous signal f independent to the reception side frame synchronous signal. The arithmetic unit 33 calculates the number of the data that remain in the frame memory 1 when the specific data, for example, the data at the offset zero, is stored in the frame memory 1 in response to the write command signal d. The downcounter 34 stores the value calculated at the arithmetic unit 33, and subtracts the value in response to the clock h. The decoder 35 outputs the command signal to the downcounter 30 when the counted value in the downcounter 34 reaches zero, to thereby store the value X of the pointer in the pointer buffer 5 to the downcounter 30.

Namely, in the second embodiment, a timing at which the specific data in the reception frame is read from the frame memory 1 in the transmission side, is ensured by a circuit consisting of the arithmetic unit 33, the downcounter 34 and the decoder 35, instead of the address storage buffer 31 and the comparator 32 in the first embodiment.

The operation of the second embodiment will be described.

Figures 7A, 7B:
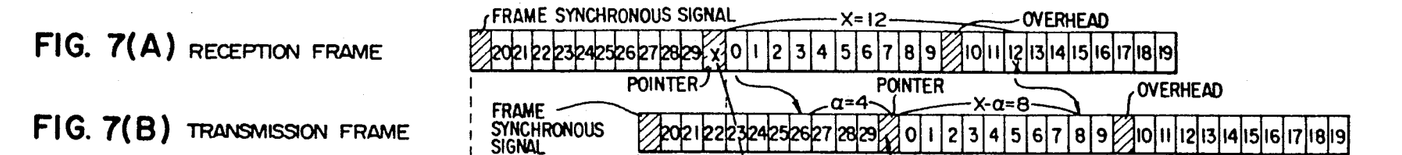
FIGS. 7(A) to 7(N) shows a timing chart representing signals in the frame phase conversion apparatus shown in FIG. 6.
Figure 7C:
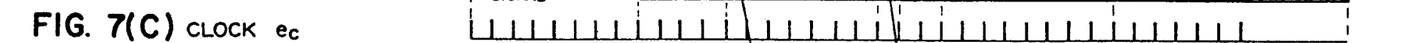
Figure 7D:
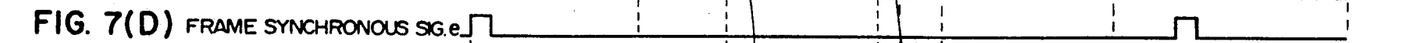
Figure 7E:
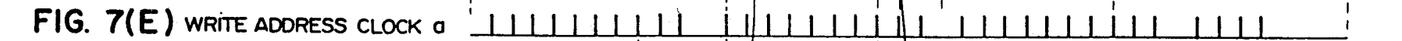
Figure 7F:
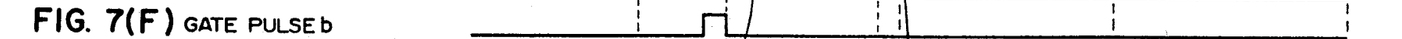
Figure 7G:
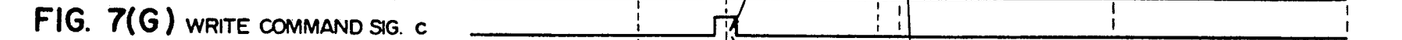
Figure 7H:
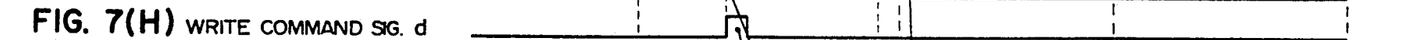
Figure 7I:
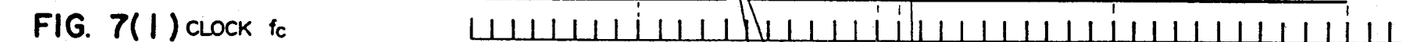
Figure 7J:
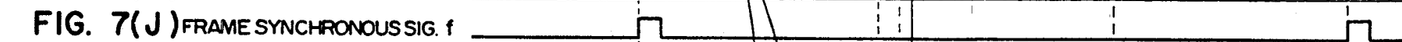
Figures 7K, 7L, 7M:
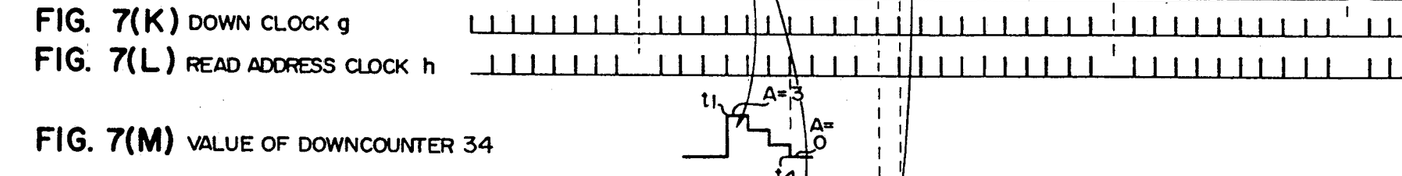
Figure 7N:
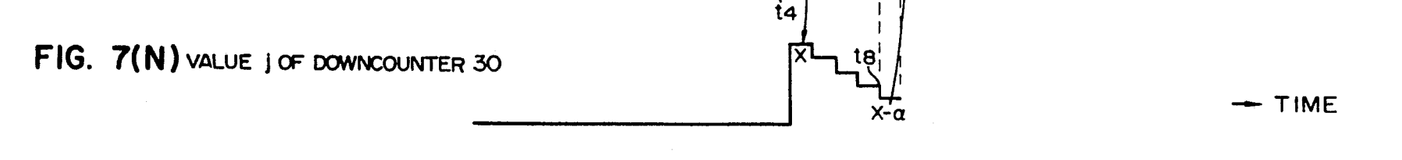

In the reception side, the arithmetic unit 33 calculates the number A of the data that remains in the frame memory 1 on the basis of the write address designated by the write control circuit 2 and the read address designated by the read control circuit 3 in response to the command signal d, when the specific data, for example, the data at the offset zero of the reception frame is stored (the time $t_1$ in FIGS. 7(A) to 7(N)). Assuming that the number of all addresses in the frame memory 1 is $A_T$, a value of the write address is $A_W$, and a value of the read address is $A_R$, the number of the data is expressed by $A=A_T-A_R+A_W$.

The arithmetic unit 33 carries out this calculation and sets the calculated value A to the downcounter 34. In the example shown in FIGS. 7(A) to 7(N), the calculated value A is three, since the data at the offset 23 in the transmission frame is read by the read address when the data at the offset zero in the reception frame are stored to the frame memory 1. Thereafter, the downcounter 34 downcounts the saved value in response to the clock h. The downcounted value of zero indicates that the data at the offset zero in the reception frame.: is read out at the transmission side (a time $t_4$ in FIGS. 7(A) to 7(N)). As a result, the value X from the pointer buffer 5 is stored to the downcounter 30 in response to the command from the decoder 35, subsequently, the downcounter 30 downcounts the stored value X in response to the clock g at the timings other than the timings at which the frame synchronous pattern and the overhead signal are appeared appear. When the value reaches zero during the countdown operation, the maximum offset, e.g. 29 when the frame shown in FIG. 2 is used, is stored into the downcounter 30. The downcounter 30 downcounts the value until the timing of the pointer in the transmission frame (a time $t_8$ in FIGS. 7(A) to 7(N)) reaches, the value in the downcounter 30 indicates the front position of the data in the transmission, i.e., the value of the pointer of the transmission side, and accordingly, that value is output by the selector 6 as the pointer.

Figure 8:
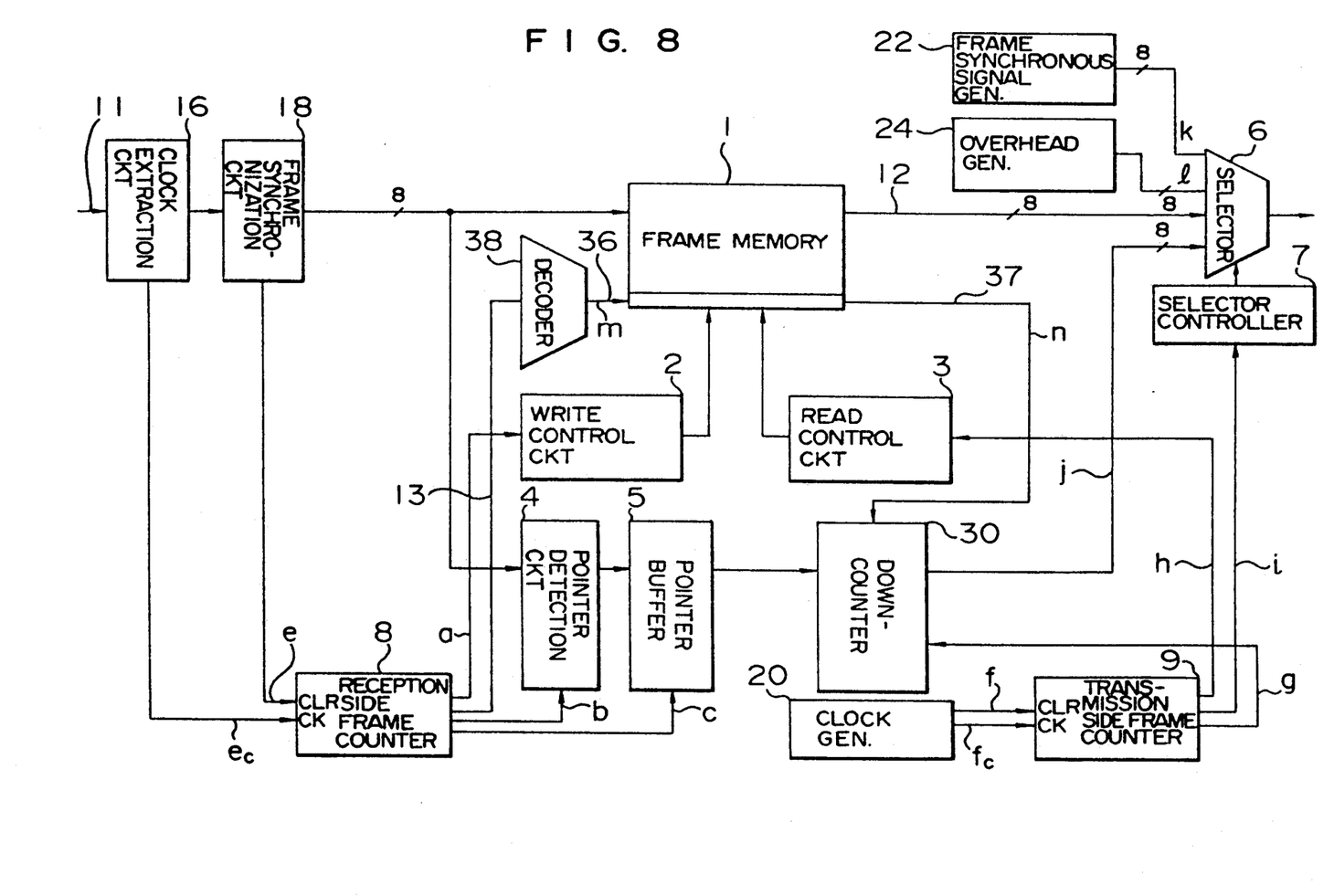
FIG. 8 is a diagram illustrating a construction of a third embodiment of a frame phase conversion apparatus in accordance with the present invention.
Figures 9A, 9B:
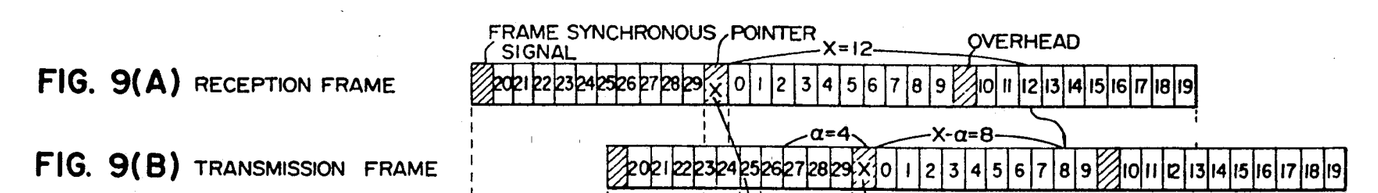
FIGS. 9(A) to 9(N) shows a timing chart representing signals in the frame phase conversion apparatus shown in FIG. 8.
Figure 9C:
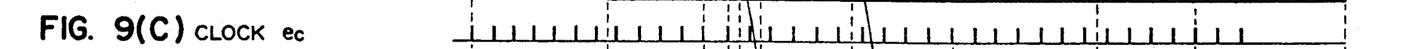
Figures 9D, 9E:
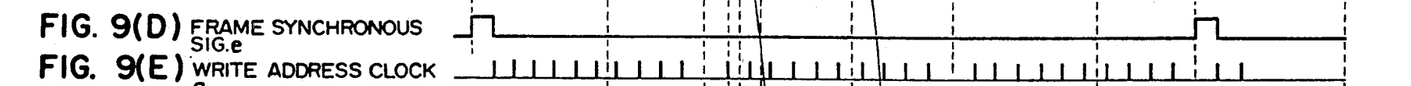
Figure 9F:
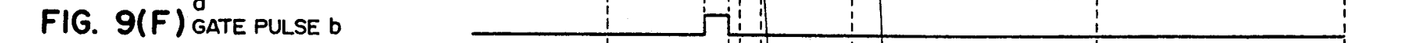
Figure 9G:
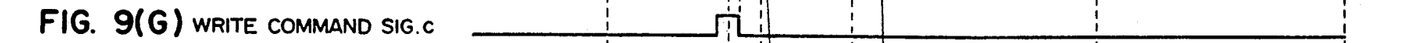
Figure 9H:
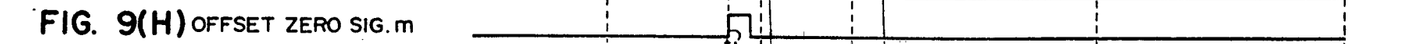
Figure 9I:
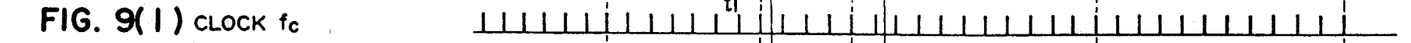
Figure 9J:
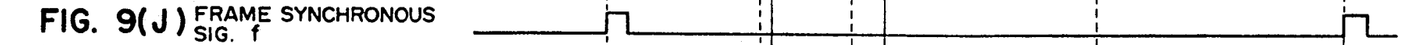
Figure 9K:
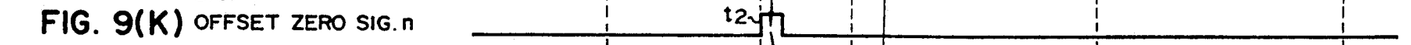
Figure 9L:
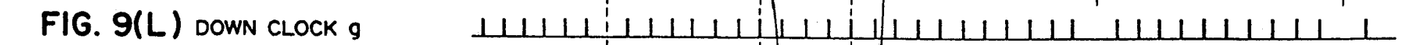
Figure 9M:
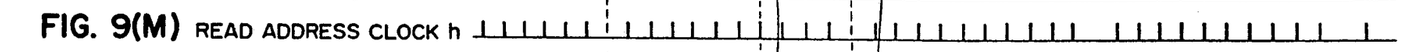
Figure 9N:
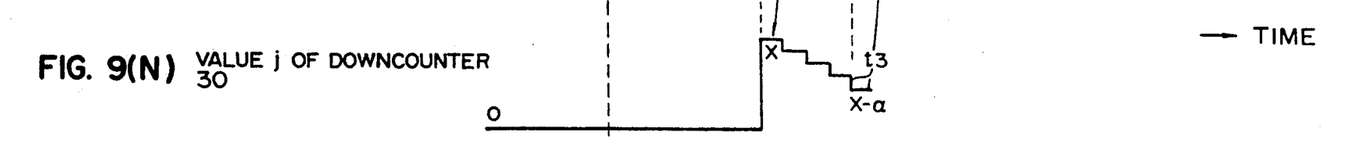

The third embodiment of the present invention will be described with reference to the construction of the frame phase conversion apparatus shown in FIG. 8 and the timing chart shown in FIGS. 9(A) to 9(N) representing timing charts of the signals shown in FIG. 8.

In the third embodiment of the present invention, the circuits having circuit constructions same as those in the first and second embodiments and the signals having purposes same as those in the first and second embodiments bear same reference numerals as the reference numerals in the first and second embodiments. Differences to the first embodiment are as follows.

The reception side frame counter 8 includes a counter which counts the clock $e_c$ and is reset by the frame synchronous signal e, and outputs the value in the counter on the signal line 13, to thereby apply same to the decoder 38. The decoder 38 supplies a signal m indicating the offset zero of the reception frame to the frame memory 1 through a signal line 36 when the value on the signal line 13 reaches the value 12 indicating the existance of the specific data such as the data at the offset zero, and the frame memory 1 stores the data at the offset zero and the signal m at a memory address designated by the write address. When the data at the offset zero is read from the frame memory 1 by the read address from the read control circuit 3, a signal n indicating the offset zero is read from the frame memory 1 and is supplied to the downcounter 30 through a signal line 37. Namely, according to the third embodiment of the present invention, the timing at which the received specific data is read at the transmission side is detected by the decoder 38 and the frame memory 1, instead of the address storage buffer 31 and the comparator 32 in the first embodiment of the present invention.

The operation of the third embodiment of the present invention will be described.

At the reception side, the decoder 38 outputs the signal m indicating the existance of the specific data at the offset zero position on the signal line 36 when the data at the offset zero position of the reception frame is stored to the frame memory 1, and thus, the signal is stored at the same address by which the data of the offset zero position is stored (the time $t_1$). If the signal n indicating the existance of the data at the offset zero position appears on the signal line 37 when the read control circuit 3 reads the data from the frame memory 1 (the time $t_2$), this means that the data at the offset zero position in the reception frame has appeared at the transmission side. At this time, the value X of the pointer buffer 5 is stored to the downcounter 30, and subsequently, the downcounter 30 downcounts the stored value in response to the clock g at the timings other than the timings at which the frame synchronous pattern and the overhead signal appears. When the value reaches zero during the downcount is carried out, the maximum offset value, for example, the value being 29 when the frame shown in FIG. 2 is used, is stored in the downcounter 30. When the downcounter 30 continues the downcounting until the time of the pointer of the transmission frame reaches, the value in the downcounter 30 indicates the front position of the data in the transmission frame, i.e., the position of the pointer.

Although the frame comprised of 33 bytes is described in these embodiments of the present invention as an example, the length of the frame is not limited to that value, and thus, the sizes of the frame synchronous signal, the pointer, the overhead signal and the data can be varied.

In addition, in the embodiments of the present invention set forth above, the downcounter 30 starts the downcounting of the value X of the pointer in the reception frame at the time at which the specific data at the offset zero position in the reception frame appears in the transmission frame, i.e., at the time slot 44 in FIGS. 4(A) to 4(E), however, the downcounter 30 can be started the downcounting at a time at which the specific data located in any position other than the position where the offset zero position appears. For example, at the time at which the data of the offset 29 is appeared at the transmission frame, the value X+1 which is obtained by adding one to the value X of the pointer is stored to the downcounter 30, and subsequently, the downcounter 30 downcounts the stored value one by one in response to the subsequent clock g until the time at which the pointer is appeared reaches, and to thereby obtain the value X−α of the pointer of the transmission frame (see FIG. 4 (D)).

Alternatively, at the time at which the data of the offset 29 appears at the transmission frame, the value X of the pointer is stored to the downcounter 30, and subsequently, the downcounter 30 downcounts the stored value one by one in response to the subsequent clock g until the time at which the offset 29 is appeared reaches, and to thereby obtain the value X−α of the pointer of the transmission frame. Alternatively, at the time at which the data of the offset 28 is appeared at the transmission frame, the value X+2 which is obtained by adding two to the value X of the pointer is stored to the downcounter 30, and subsequently, the downcounter 30 downcounts the stored value one by one in response to the subsequent clock g until the time at which the pointer is appeared reaches, and to thereby obtain the value X−α of the pointer of the transmission frame (see FIG. 4(E)).

Figure 4D:
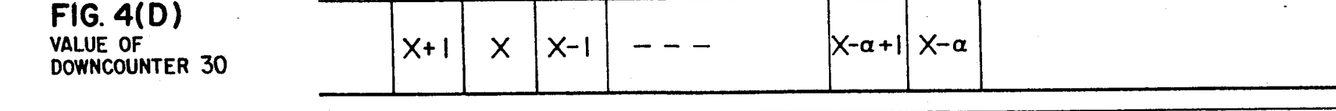
Figure 4E:
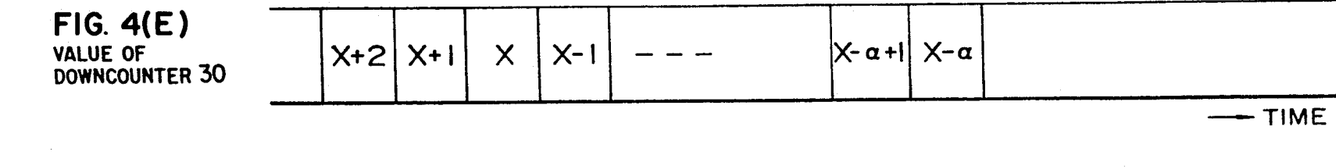
Figure 10A:
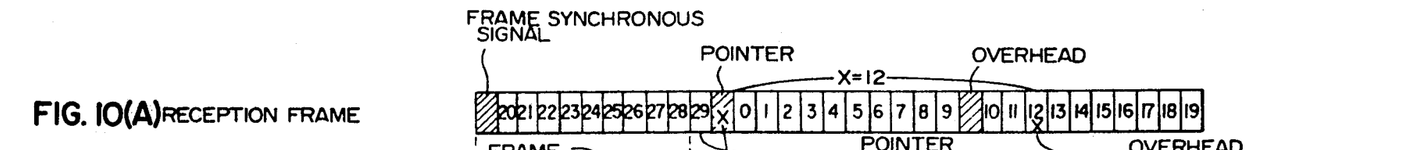
FIGS. 10(A) to 10(N) shows a timing chart representing signals of a fourth embodiment of a frame phase conversion apparatus shown in accordance with the present invention.
Figures 10B, 10C:
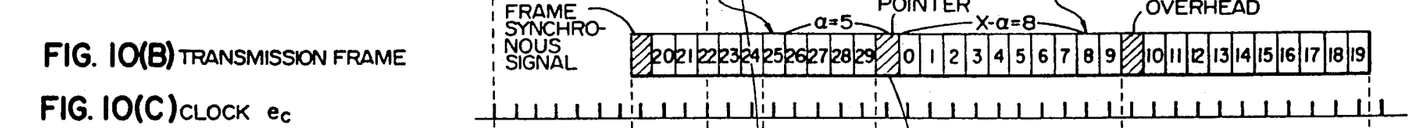
Figures 10D, 10E, 10F:
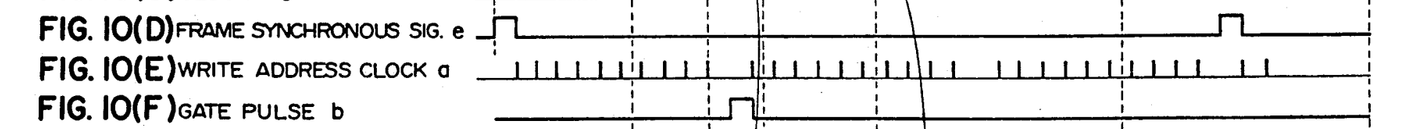

Now, the fourth embodiment of the present invention in which the operation timing shown in FIG. 4(D) is obtained by the construction shown in, for example, FIG. 1 will be described with reference to the circuit construction shown in FIG. 1 and a timing chart shown in FIGS. 10(A) to 10(N).

Figures 10G, 10H, 10I:
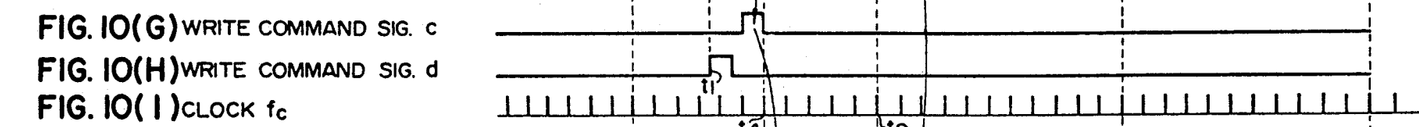
Figures 10J, 10K:
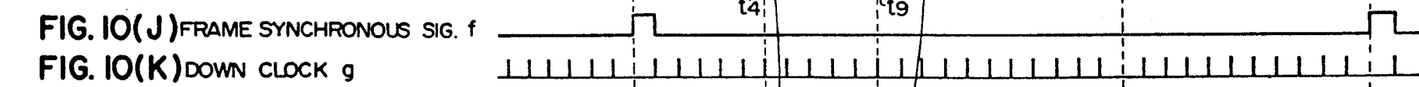
Figures 10M, 10N:
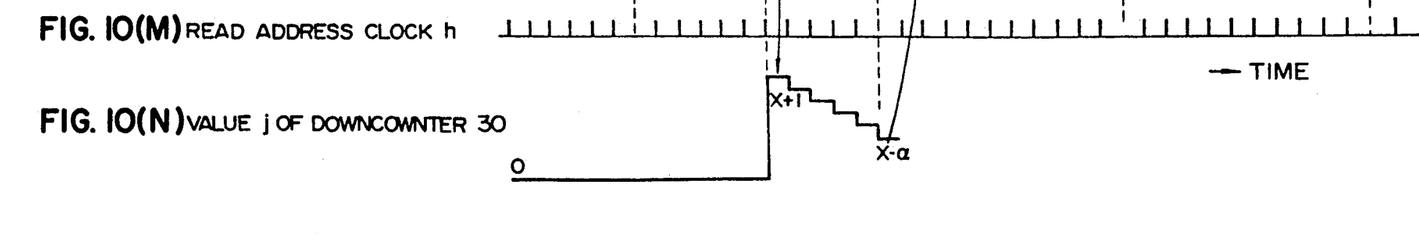

As shown in FIG. 10(H), the write control signal d is a signal synchronized with the specific data at the offset 29 in the reception frame, and the address storage buffer 31 stores the write address of the offset 29 in response to the write control signal (time $t_1$). The pointer buffer 5 receives the value X of the pointer in the reception frame from the pointer detection circuit 4 in response to the command signal c synchronized with the pointer in the reception frame, and outputs the value X+1 to the downcounter 30. Assuming that the data at the offset 29 in the reception frame appears at the position of the offset 25 in the transmission frame, the address from the read control circuit 3 coincides with the write address in the address storage buffer 31 at the time $t_4$, and accordingly, the downcounter 30 receives the value X+1 from the pointer buffer 5 and downcounts in response to the clock g. As a result, the value $j = X − α$ in the downcounter 30 is set as the value of the pointer at the time $t_9$.

The pointer buffer 5 may output the value X of the pointer, and the downcounter 30 can be started the downcount from the value X+1.

As described above, according to the present invention, the value of the pointer in the transmission frame is calculated by using the difference between the relative phase in the reception frame and the relative phase in the transmission frame at which the data same as the data in the reception frame is appeared, and the value of the pointer in the transmission frame, and consequently, the value of the pointer of the transmission frame can be rapidly determined, and also the conversion of the value of the pointer in the reception frame can be carried out within one frame transmission time when the change of the value of the pointer in the reception frame is detected.

We claim:

1. A method for phase-converting a plurality of frames, said plurality of frames comprising a received frame including a plurality of data, a frame synchronous signal positioned in a predetermined first relative phase position in the received frame, and a pointer positioned in a predetermined second relative phase position and a value indicating a phase position difference between the predetermined second relative phase position and a front position of the data stored in the received frame, said method comprising the steps of:

consecutively receiving said plurality of frames;

sequentially storing a predetermined number of data from said plurality of data of the received frame in a transmission frame in accordance with a received order, and storing said frame synchronous signal and said pointer of said received frame in a first relative phase position and a second relative phase position in said transmission frame, said first relative phase position being independent of said second relative phase position, to form the transmission frame;

detecting a fourth relative phase position of said transmission frame, and storing at said fourth relative phase position a first data corresponding to a specific data stored in a third relative phase position of said received frame;

obtaining a first difference of positions between said fourth relative phase position and said third relative phase position; and storing a second difference between said value of said pointer of said received frame and said first difference being obtained as a value of said pointer in said transmission frame.

2. The method for phase-converting said plurality of frames according to claim 1, wherein said specific data is located immediately downstream of said pointer.

3. The method for phase-converting said plurality of frames according to claim 1, wherein said specific data is located immediately upstream of said pointer.

4. The method for phase-converting said plurality of frames according to claim 1, wherein said step of obtaining said first difference and said step of storing said value of said pointer in said transmission frame are carried out after said pointer in said reception frame is received and before the value of the pointer of said transmission frame is stored.

5. A method for phase-converting a plurality of frames, said plurality of frames comprising a received frame, said received frame including a plurality of data units, each of the data units including a plurality of data, and each of said data units being time-serially positioned, a frame synchronous signal positioned at a predetermined first relative phase position in the received frame, and a pointer positioned at a predetermined second relative phase position in the received frame and a value indicating the number of said data between the predetermined second relative phase position and a front position of said data stored in the received frame, said method comprising the steps of:

consecutively receiving said plurality of frames;

sequentially storing a predetermined number of data from said plurality of data units of the received frame in a transmission frame in accordance with a received order, and storing said frame synchronous signal and said pointer of said received frame in a first relative phase position and a second relative phase position in said transmission frame, said first relative phase position being independent of said second relative phase position, to form the transmission frame;

detecting a fourth phase position in said transmission frame, and storing at said fourth relative phase position a first data corresponding to a specific data located in a third relative phase position of said received frame;

obtaining a number of positions between said fourth relative phase position and said third relative phase position; and storing a difference between said value of said pointer of said received frame and said number obtained as a value of said pointer in said transmission frame.

6. The method for phase-converting a plurality of frames according to claim 5, wherein said specific data is located immediately downstream of said pointer.

7. The method for phase-converting a plurality of frames according to claim 5, wherein said specific data is located immediately upstream of said pointer.

8. The method for phase-converting a plurality of frames according to claim 5, wherein said step of obtaining said number and said step of storing said value of said pointer are executed after said pointer of said reception frame is received and before a time in which the said value of the pointer of the transmission frame is stored.

9. A method for phase-converting a plurality of frames, said plurality of frames comprising a received frame, said received frame including a plurality of data units, each of the data units including a plurality of data, each of said data units being time-serially positioned, a frame synchronous signal positioned in a predetermined first relative phase position of the received frame, and a pointer positioned in a predetermined second relative phase position of the received frame and a value indicating a number of positions of said data between the predetermined second relative phase position and a front position of said data in the received fame, said method comprising the steps of:

consecutively receiving said plurality of frames;

sequentially storing a predetermined number of data from said plurality of data units of the received frame in a transmission frame by a predetermined timing signal in accordance with a received order, and storing said frame synchronous signal and said pointer of said received frame in a first relative phase position and a second relative phase position in said transmission frame, said first relative phase position being independent of said second relative phase position, to form the transmission frame;

detecting a timing signal in which a first data corresponding to a specific data located in a third relative phase position of said received frame is located in said transmission frame;

obtaining a first value by subtracting said value of said pointer of said received frame and said third relative phase position by one in response to said predetermined timing signal, at a time synchronized with said timing signal which is detected; and storing said first value obtained by the subtraction at a pointer in said transmission frame.

10. A method for phase-converting a plurality of frames according to claim 9, wherein said specific data is located immediately downstream of said pointer of said received frame.

11. A method for phase-converting a plurality of frames according to claim 9, wherein said specific data is located immediately upstream of said pointer of the received frame, and said first value is obtained by adding one to said value of said pointer said received frame.

12. A method for phase-converting a plurality of frames according to claim 9, wherein said specific data is located immediately upstream of said pointer and wherein said step of obtaining the first value, as said pointer in said transmission frame, includes the step of storing said first value at the timing signal after the data located immediately upstream of said data unit is stored in said transmission frame, as said value of said pointer in said transmission frame.

13. An apparatus for phase-converting a plurality of frames, said plurality of frames including a received frame, said received frame including a plurality of data, a frame synchronous signal positioned in a predetermined first relative phase position, and a pointer positioned in a predetermined second relative phase position and a value indicating a phase difference between the predetermined second relative phase position and a front position of the plurality of data in the frame, said value being stored in said pointer, said apparatus comprising:
- first memory means for consecutively receiving said plurality of frames and consecutively storing said plurality of data in said received frame;
- means for sequentially reading said plurality of data from said first memory means in accordance with a received order and sequentially storing said plurality of data being read in a transmission frame, and further storing said frame synchronous signal and said pointer of said received frame in a first and a second relative phase positions in said transmission frame, said first relative phase position being independent to said second relative phase position, to form the transmission frame;
- means for detecting a fourth relative phase position in said transmission frame, said fourth relative phase position having a first data corresponding to a specific data stored in a third relative phase position of said received frame;
- means for obtaining a first difference of positions between said fourth relative phase position and said third relative phase position; and
- means for storing a second difference between said value of said pointer of said received frame and said first difference as a value of a pointer in said transmission frame.

14. An apparatus for phase-converting a plurality of frames according to claim 13, further comprising:
- write address generating means for generating a write address signal for storing said plurality of data in said first memory means and supplying said write address signal to said first memory means;
- read address generating means for generating a read address signal for sequentially reading said plurality of data from said first memory means and supplying said read address signal to said first memory means; and
- second memory means for storing said write address signal corresponding to a specific data of said reception frame in said first memory means,
- said fourth relative phase detecting means including means for detecting a coincidence signal with said read address signal generated by said read address generating means and said write address signal stored in said second memory means, and means for detecting when said read and write address signals are matched to generate said coincidence signal.

15. An apparatus for phase-converting a plurality of frames according to claim 13, further comprising:
- write address generating means for generating a write address signal for storing said plurality of data in said first memory means and supplying said write address signal to said first memory means; and
- read address generating means for generating a read address signal for sequentially reading said plurality of data from said first memory means and supplying said read address signal to said first memory means, and
- wherein said fourth relative phase detecting means includes
- means for obtaining the number of data remaining in said first memory means when said specific data of said reception frame is stored in said first memory means in response to said write address signal and read address signal
- means for subtracting the number of data read from said first memory means from the number of said data remaining, and
- means for detecting when a result of said subtracting means reaches zero for generating a coincidence signal.

16. An apparatus for phase-converting a plurality of frames according to claim 13, wherein said fourth relative phase detecting means includes means for storing a first discriminating information signal indicating that said specific data is stored in said first memory means and means for generating a second discrimination signal when said first discrimination signal is stored.

17. An apparatus for phase-converting a plurality of frames, said plurality of frames comprising a received frame, said received frame including a plurality of data units, each of the data units including a plurality of data, said data units being time-serially positioned, a frame synchronous signal positioned in a predetermined first relative phase position in the received frame, and a pointer positioned in a predetermined second relative phase position and a value indicating the number of said data between the predetermined second relative phase position and a front position of said plurality of data of the received frame, said apparatus comprising:
- first memory means for receiving said plurality of frames and sequentially storing said plurality of frames as read data;
- means for receiving said read data from said first memory means and sequentially storing said read data in a transmission frame at a predetermined first timing signal in accordance with a received order, and further storing said frame synchronous signal and said pointer of said received frame in a first relative phase position and a second relative phase position in said transmission frame, said first relative phase position being independent from said second relative phase position, to form the transmission frame;
- means for detecting a second timing signal in which a first data corresponding to a specific data located in a third relative phase position of said received frame is stored in said transmission frame;
- means for obtaining a first value, by subtracting said value of said pointer of said reception frame and said third relative phase position by one in response to said predetermined first timing signal, after said second timing signal is detected; and
- means for storing said first value at a time when said pointer is located in said transmission frame.

18. An apparatus of phase-converting a frame according to claim 17, further comprising:
- write address generating means for generating a write address signal for storing said received data in said first memory means and supplying said write address signal to said first memory means,
- read address generating means for generating a read address signal for sequentially reading said read data from said first memory means and supplying said read address signal to said first memory means, and
- second memory means for storing a write address signal of a specific data of said reception frame to said first memory means,
- said timing detecting means including means for detecting a coincidence signal corresponding with said read address signal generated by said read address generating means and said write address signal of said specific data stored in said second memory means, and means for detecting when said write and read address signals are matched.

19. The apparatus for phase-converting a said plurality of frames according to claim 17, wherein said specific data located immediately downstream of said pointer of said reception frame.

20. The apparatus for phase-converting a said plurality of frames according to claim 17, wherein said specific data is located immediately upstream of said pointer and said first value is a value obtained by adding one to said value of said pointer of said reception frame.

21. An apparatus for phase-converting a plurality of frames according to claim 17, wherein said specific data is located immediately upstream of said pointer of said reception frame, and wherein said storing means stores said first value of said subtracting means at the second timing signal when the data located immediately upstream of said data unit is stored in said transmission frame, as said value of pointer in said transmission frame.

22. The apparatus for phase-converting the plurality of frames as in claim 13, further comprising: a pointer detection circuit for detecting said pointer of the value of said reception frame.

23. The apparatus for phase-converting the plurality of frames as in claim 22, further comprising: a pointer buffer to store the pointer of the value.

24. The apparatus for phase-converting the plurality of frames as in claim 23, further comprising: a downcounter for downcounting the pointer of the value to generate said second difference.

25. The apparatus for phase-converting the plurality of frames as in claim 24, further comprising: a transmission side frame counter to generate clock pulses corresponding to said transmission frame.

26. The apparatus for phase-converting the plurality of frames as in claim 25, wherein said downcounter is decremented by said clock pulses until a clock pulse corresponding to the first data of the transmission frame is generated.

* * * * *